(12) United States Patent
Hume et al.

(10) Patent No.: US 8,179,886 B2
(45) Date of Patent: May 15, 2012

(54) SYSTEM FOR SUPPORTING ANALOG TELEPHONES IN AN IP TELEPHONE NETWORK

(75) Inventors: Ronald Hume, Tamarac, FL (US); Paul Krzyzanowski, Flemington, NJ (US)

(73) Assignee: OpenPeak Inc., Boca Raton, FL (US)

( * ) Notice: Subject to any disclaimer, the term of this patent is extended or adjusted under 35 U.S.C. 154(b) by 1239 days.

(21) Appl. No.: 11/877,429

(22) Filed: Oct. 23, 2007

(65) Prior Publication Data

US 2009/0103691 A1 Apr. 23, 2009

(51) Int. Cl.
*H04L 12/66* (2006.01)
*H04L 12/28* (2006.01)
*H04M 3/42* (2006.01)

(52) U.S. Cl. ... 370/356; 370/392; 370/401; 379/207.03; 379/207.16

(58) Field of Classification Search .......... 370/352–356, 370/231, 259, 392, 401; 379/376.01, 376.02
See application file for complete search history.

(56) References Cited

U.S. PATENT DOCUMENTS

| 7,006,455 | B1 | 2/2006 | Fandrianto et al. |
| 7,136,466 | B1 | 11/2006 | Gao |
| 7,508,816 | B1 * | 3/2009 | Everson et al. ............... 370/352 |
| 2004/0240432 | A1 * | 12/2004 | Ying et al. ..................... 370/352 |
| 2007/0115946 | A1 * | 5/2007 | Schaade et al. ............... 370/356 |
| 2007/0121921 | A1 | 5/2007 | Silver |
| 2007/0201472 | A1 | 8/2007 | Bhatia et al. |
| 2008/0013540 | A1 * | 1/2008 | Gast .............................. 370/392 |
| 2008/0043727 | A1 * | 2/2008 | Smitheimer ................... 370/352 |
| 2008/0114871 | A1 * | 5/2008 | Biswas et al. .................. 709/224 |

OTHER PUBLICATIONS

An International Search Report and the Written Opinion prepared for Int'l Patent Application No. PCT/US2008/011992 dated Apr. 27, 2010, 5 pages.
An International Search Report and the Written Opinion prepared for Int'l Patent Application No. PCT/US2008/011992 on Jan. 8, 2009, and mailed on Jan. 15, 2009, 9 pages.

* cited by examiner

*Primary Examiner* — Melanie Jagannathan
(74) *Attorney, Agent, or Firm* — Sterne, Kessler, Goldstein & Fox P.L.L.C.

(57) ABSTRACT

An integrated VoIP phone that seamlessly integrates POTS phones and IP phones is provided. In an embodiment, the integrated VoIP phone includes a Session Initiation Protocol ("SIP") registrar, a SIP session border control ("SBC"), a SIP proxy, a SIP feature server, a SIP-PSTN gateway, a user interface and VoIP telephony functionality found in traditional VoIP phones. In an embodiment, the integrated VoIP phone includes one or more analog telephone adaptors. Other VoIP entities, such as FXS adaptors, register themselves with the integrated VoIP phone through the SIP SBC. These other entities appear as extensions on the integrated VoIP phone and the outside network will only directly communicated with the integrated VoIP phone.

14 Claims, 7 Drawing Sheets

SYSTEM FOR SUPPORTING ANALOG TELEPHONES IN AN IP TELEPHONE NETWORK

BACKGROUND OF THE INVENTION

1. Field of the Invention

The invention relates to communications, and more particularly to voice over Internet Protocol ("VoIP").

2. Background Art

The Internet has fundamentally changed the ways in which we communicate by increasing the speed of communication, the range of communicating devices, and the platforms over which these devices send and receive information. The growth has been possible because the Internet employs an open network architecture using a common protocol—the Internet Protocol, or IP—to transmit data across networks in a manner fundamentally different than the way in which signals transmit a circuit-switched service. Within an IP network, data is segmented into packets and transmitted over a series of physical networks that may include copper, fiber, coaxial cable or wireless facilities.

Broadband services that rely on IP networking, such as email, file transfer, world wide web, peer-to-peer file sharing, instant messaging, streaming media, online gaming and voice over Internet Protocol ("VoIP") have been deployed across multiple platforms, including those provided by traditional telephone companies, cable operators, direct broadcast satellite ("DBS"), video programming providers, wireless providers and even electric companies using power lines.

VoIP services have experienced dramatic and unprecedented growth over the last few years. VoIP services can also be referred to as IP telephony, Internet telephony, Internet voice, broadband telephony, broadband phone and voice over broadband. Early ventures in peer-to-peer IP telephony were largely unsuccessful due in part to the nature of early IP networks, which offered limited reliability, poor voice quality and supported limited integration with the large embedded circuit-switched based public switched telephone network ("PSTN").

In particular, for VoIP services to be of acceptable quality, high speed backbone networks and high speed access to these networks is essential. As defined by the Federal Communications Commission, high speed access lines refer to lines that support transmission rates of 200 Kbs or greater. From 1999 to 2006, high speed access line growth within the United States has expanded from only 2.8 M lines in 1999 to over 64.6 M lines in 2006, as reported by the Federal Communications Commission. Furthermore, the current growth rate remains exceptionally high with the number of high speed lines increasing by over 26% during the first half of 2006 from 51.2 M to 64.6 M.

Recently, at least in part as a result of the significant growth of high speed lines, VoIP services have begun to grow. According to the Yankee Group, during 2006 consumer VoIP adoption reached more than nine million subscribers, with penetration into about nine percent of U.S. households, which was up from four percent in 2005. Clearly the growth of VoIP services is in its infancy. A major impediment to continued growth and acceptability, is the integration of traditional or legacy telephones, also referred to as Plain Old Telephone Service ("POTS") phones with IP-based phones.

Current solutions to this integration challenge are problematic. One approach is to use a POTS telephone to VoIP adapter, referred to as an FXS adaptor. Unfortunately, when using an FXS adaptor, all legacy phones must be connected to the adaptor and no standalone VoIP phone can coexist on the network. Another approach is the deployment of an IP Public Branch Exchange ("IP PBX"). This approach is similarly problematic, and also is a more costly alternative that is not financially appealing to residential users.

What is needed are cost-effective systems and methods that support the seamless integration of existing POTs phones and IP phones for placing and receiving VoIP calls.

BRIEF SUMMARY OF THE INVENTION

The present invention provides an integrated VoIP phone that seamlessly integrates POTS phones and IP phones. In an embodiment, the integrated VoIP phone includes a Session Initiation Protocol ("SIP") registrar, a SIP session border control ("SBC"), a SIP proxy, a SIP feature server, a SIP-PSTN gateway, a user interface and VoIP telephony functionality found in traditional VoIP phones. In an embodiment, the integrated VoIP phone includes one or more analog telephone adaptors. Other VoIP entities, such as FXS adaptors, register themselves with the integrated VoIP phone through the SIP SBC. These other entities appear as extensions on the integrated VoIP phone and the outside network will only directly communicated with the integrated VoIP phone.

In embodiments the integrated VoIP phone supports a plethora of enhanced features. An integrated VoIP phone can register multiple phone numbers (actually SIP uniform resource identifiers ["URIs"]) and perform distinctive ringing, subset routing, etc. Additionally, an integrated VoIP phone can allow DID (direct inward dial) ring of specific terminals (i.e. VoIP extensions) where only a subset of terminals would ring for a given inbound request and/or allow a forking proxy function to ring all or a subset of VoIP/POTS terminals based on an inbound request.

An integrated VoIP phone can disable registration or perform ring suppression when the user is outside the home. Furthermore, an integrated VoIP phone allows a user to specify a distinctive ring based on caller ID information, set time of-day customization and forwarding, and custom voicemail prompts based on caller ID information. In other embodiments, an integrated VoIP phone can register multiple users to a carrier registrar and provide unique indication to some or all terminals. An integrated VoIP phone also can provide extension addressing to both VoIP and POTS lines. This can be accomplished via multiple FXS ports on the VoIP phone or via unique ring cadence to all the POTS stations connected to the FXS port.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
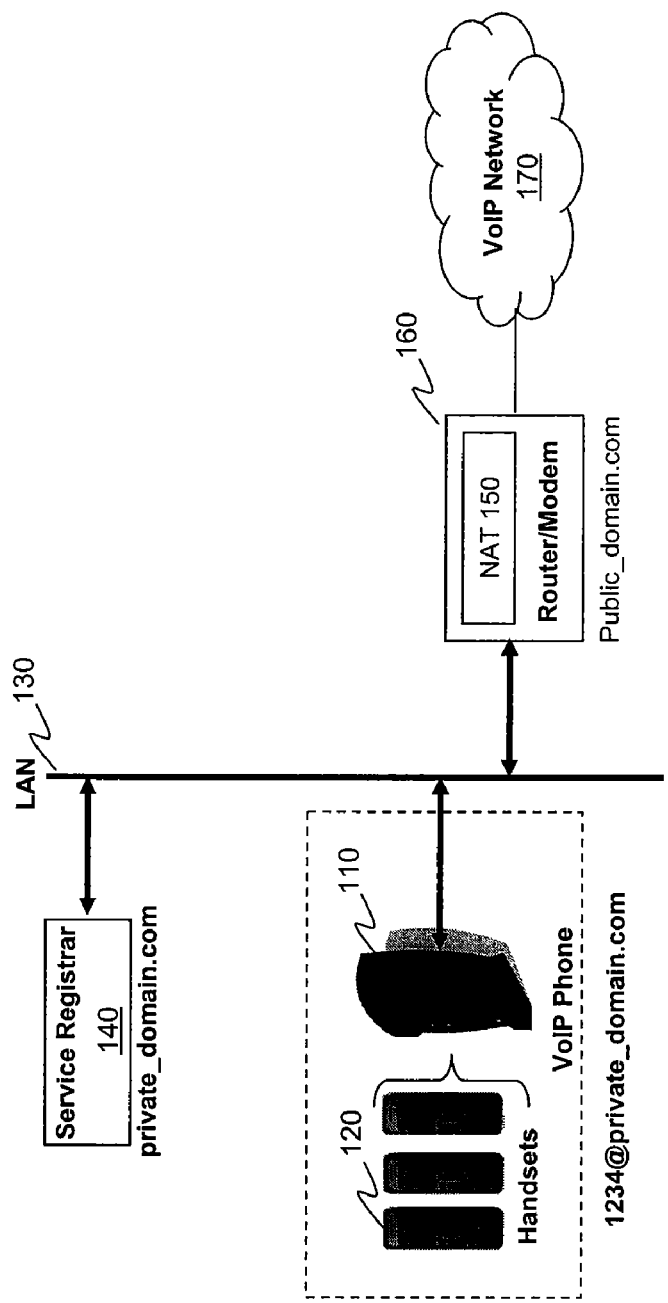
FIG. 1 is a diagram of a portion of a telephone network illustrating a method of connecting an IP telephone to an IP voice network.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

FIG. 1 illustrates a typical VoIP system 100. As shown in FIG. 1, a VoIP phone 110 is in communication with handsets 120 that allow a user to place and receive calls through VoIP network 170. VoIP phone 110 is connected directly to a LAN (Local Area Network) 130. LAN 130 is connected to a Router/Modem 160 which is connected to VoIP network 170. Router/Modem 160 can be a DSL (Direct Subscriber Line) modem, a cable modem, or a FiOS modem and has a public IP address (e.g. public_domain.com) for receiving packets from VoIP network 170.

A service registrar device 140 with a private IP address (e.g. private_domain.com) is also connected to LAN 130. NAT (network address translation) device 150 rewrites source and destination addresses packets as they pass through router/modem 160 so they can be received by service registrar device 140. Service registrar device 140 manages access information for the VoIP phone 110. That is, upon a registrar request from the VoIP phone 110, service registrar device 140 provides VoIP phone 110 with a unique address (1234@private_domain.com). This address serves as a phone number for the VoIP phone 110. When VoIP system 100 implements Session Initiation Protocol (SIP), the unique address is referred to as a SIP URI (Universal Resource Identifier). For further information regarding SIP, see, e.g., "RFC 3261: SIP: Session Initiation Protocol" by the IETF, the disclosure of which is hereby incorporated by reference.

Figure 2:
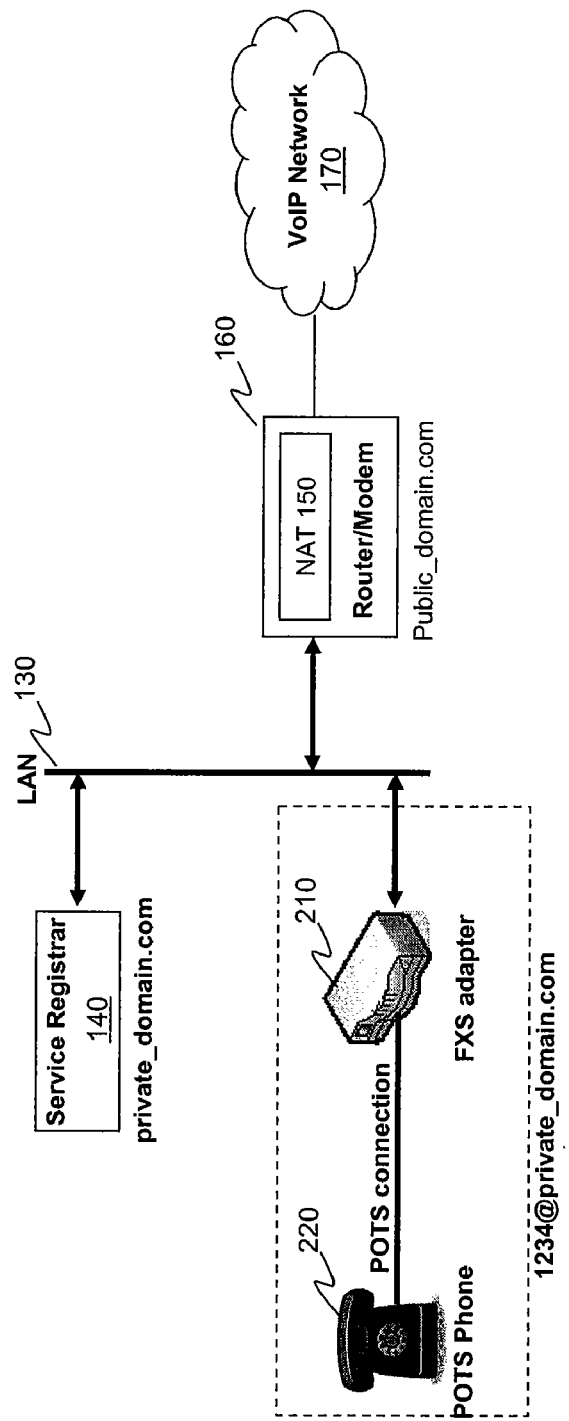
FIG. 2 is a diagram of a portion of a telephone network illustrating a method of connecting an analog telephone to an IP voice network.

FIG. 2 is a diagram of a portion of a telephone network 200 illustrating a method of connecting an analog telephone to an IP voice network. In FIG. 2 a POTS/analog phone 220 is connected to an analog telephone adapter ("ATA"), such as, for example FXS (Foreign Exchange Station) adapter 210. FXS adapter 210 provides a POTS connection and an Ethernet connection. FXS adapter 210 converts POTS communications to Ethernet communications. Using FXS adapter 210, POTS phone 220 can be connected to local area network ("LAN") 130. Examples of FXS adapters 210 are those manufactured by Cisco, Linksys, and Motorola. FXS adapter 210 operates in a similar manner to VoIP phone 110 in FIG. 1 in that sends a registration request to service registrar 140 and receives a unique address.

In some situations, a user may have a VoIP phone 110 and want to have legacy POTS phones 220 work with the VoIP service. When the user attempts to connect a VoIP phone 110 and a FXS adapter 210 to the same LAN 130, each will registrar with service registrar 140. When each of multiple VoIP phones 110, multiple FXS adapters 210, or a combination VoIP phones 110 and FXS adapters 210 registrar, the service registrar 140 and NAT 150 devices on the LAN 130 will not allow the devices to have a shared address. Thus, a FXS adapter 210 and a VoIP phone 110 cannot co-exist with a shared number in VoIP systems 100 or 200. As a result the integration of POTs phones with VoIP phones is not possible.

Figure 3:
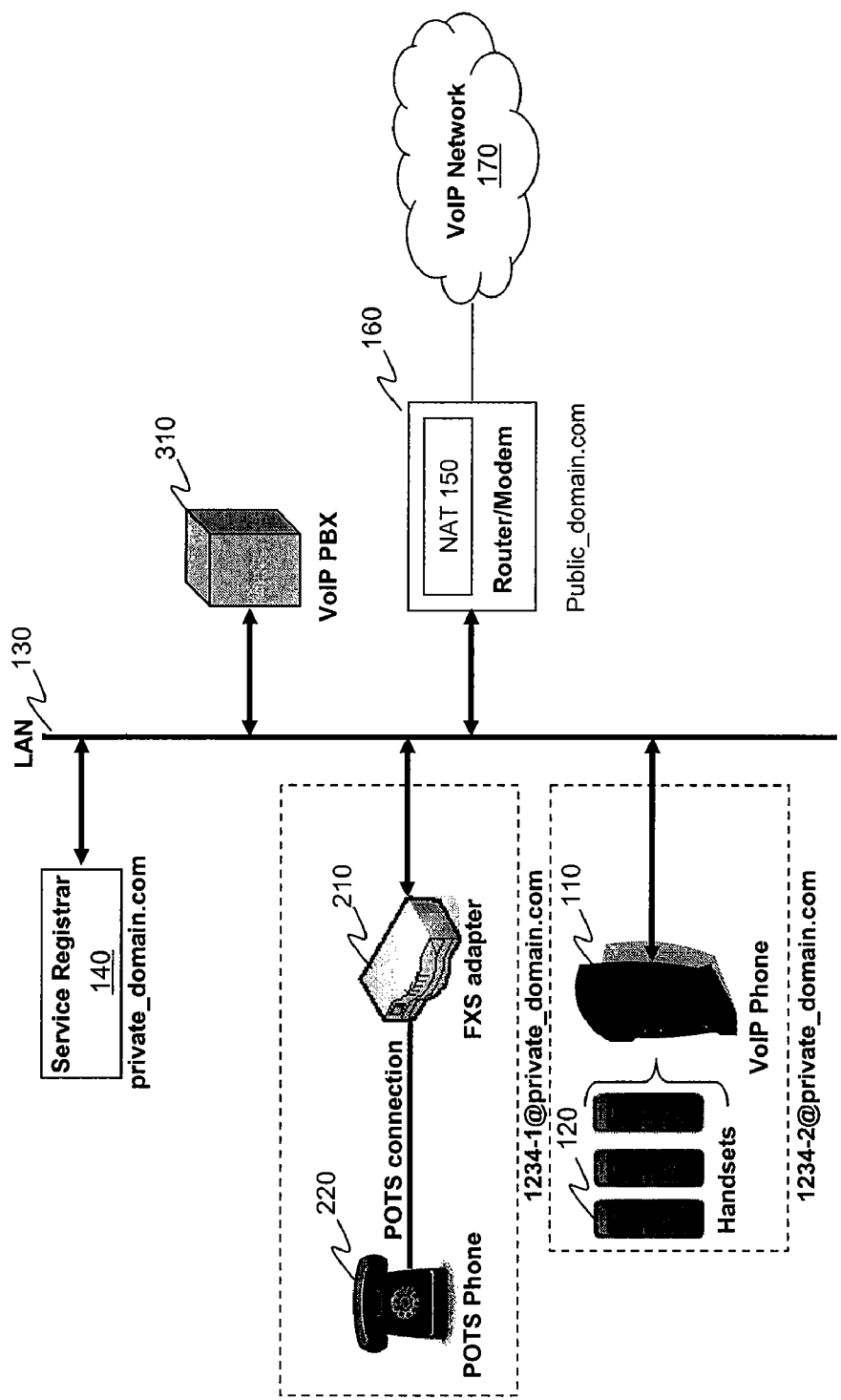
FIG. 3 is a diagram of a portion of a telephone network illustrating a method of connecting an IP telephone and analog telephone to an IP voice network via the same local area network using a VoIP PBX.

FIG. 3 is a diagram of a portion of a telephone network 300 illustrating a method of connecting POTS telephones and VoIP telephones to the same local area network using a VoIP private branch exchange ("PBX"). When the VoIP PBX 310 is connected to LAN 130, VoIP PBX 310 allows VoIP phone 110 and FXS adapter 210 to registrar with service registrar 140 without conflict. As shown is FIG. 3, VoIP PBX 310 allows VoIP phone 110 and FXS adapter 210 to be extensions of one another. That Is, FXS adapter 210 is extension-I at 1234@private_domain.com and VoIP Phone is extension-2 at 1234@private_domain.com. It should be noted that, some VoIP PBXs 310 allow VoIP phones 110 and FXS adapters 210 to be connected directly. While running a VoIP PBX 310 will allow each FXS adapter 210 and each VoIP phone 110 to register itself, running a VoIP PBX 310 in the home is not a convenient or always practical solution for most consumers.

Figure 4:
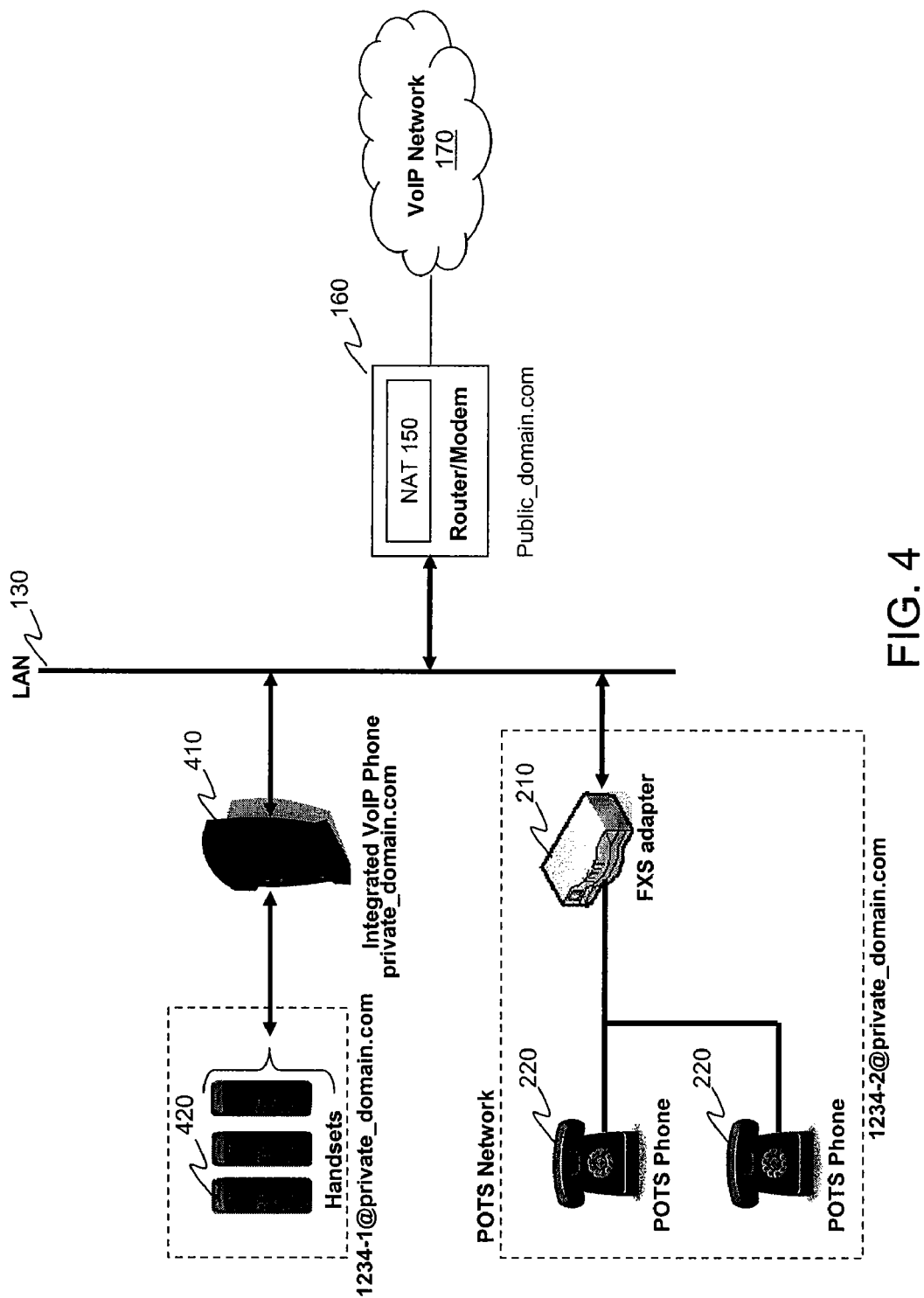
FIG. 4 is a diagram of a portion of a telephone network illustrating a method of connecting an IP telephone and analog telephone to an IP voice network via the same local area network, according to an exemplary embodiment of the invention.

FIG. 4 is a diagram of a portion of a telephone network 400 illustrating a method of connecting an IP telephone and analog telephone to an IP voice network via the same local area network, according to an exemplary embodiment of the invention. Telephone network 400 allows multiple VoIP entities including: ATAs (e.g. FXS adapters) and VoIP phones to coexist on a LAN. Telephone network 400 includes: previously described elements LAN 130, NAT 140, Router/Modem 160, VoIP network 170, FXS adapter 210, and POTS phones 220. Reference is made to FIGS. 1-3 for descriptions of these elements.

Telephone network 400 also includes integrated VoIP phone 410 and handsets 420. In the exemplary embodiment, handsets 420 communicate wirelessly with integrated VoIP phone 410 using Wi-Fi or DECT (Digital Enhanced Cordless Telecommunications) protocols.

Integrated VoIP phone 410 enables other VoIP entities to register themselves with integrated VoIP phone 410, thereby eliminating the conflicts identified with respect to network 200 and the cost and convenience issues associated with network 300.

Figure 5:
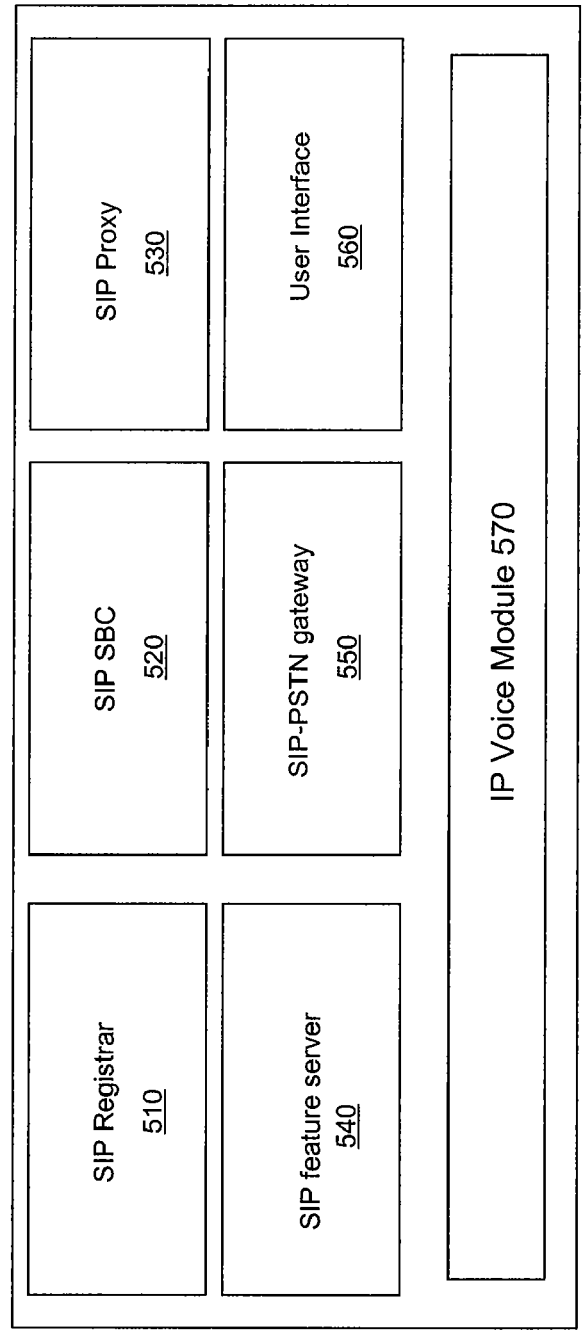
FIG. 5 is a diagram an IP telephone, according to an exemplary embodiment of the invention.

FIG. 5 provides a functional block diagram of integrated IP phone 410, according to an exemplary embodiment of the present invention. Integrated VoIP telephone 410 includes: a SIP registrar 510, SIP SBC 520, SIP proxy 530, SIP feature server 540, SIP-PSTN gateway 550, a user interface 560 and an IP voice module 570.

SIP registrar 510 is similar to service registrar 140 in that it manages access information for VoIP entities. In the example of FIG. 4, SIP registrar 510 manages registration information for integrated VoIP phone 410 and FXS adapter 210. In the exemplary embodiment, the SIP registrar is software that can be implemented using available commercial or open source products (e.g., Asterisk).

SIP SBC 520 is a B2BUA (back-to-back user agent) that receives incoming requests and processes them accordingly. SIP SBC 520 allows VoIP entities to registrar themselves with the integrated VoIP phone 410 by processing registration requests and sending them to SIP registrar 510. In the exemplary embodiment, VoIP entities appear as extensions on the integrated VoIP phone 410 and the VoIP network 170 will communicate only with the integrated VoIP phone 410. This allows seamless integration of existing POTS phones 220 as extensions on an integrated VoIP phone 410. When there are multiple VoIP phones on LAN 130, each will register via integrated VoIP phone 410. An election algorithm can be used to determine such a phone among VoIP peers. In the exemplary embodiment SIP SBC 520 is software that can be implemented using available commercial or open source products.

SIP proxy 530 is effectively an application-layer router. SIP proxy 530 makes SIP message forwarding decisions and forward messages downstream to other SIP network elements (other proxies, UAs (User Agents), etc). Typically, a proxy will just add its 'Via:' to a message and send it along. Downstream elements that wish to respond do so by unwinding the 'Via:' header stack. However, SIP proxy 530 includes a forking proxy function.

A forking proxy function provides the capability for a determination to be made that multiple downstream entities should receive a SIP message, effectively 'forking' the message stream into multiple downstream legs. A use of forking is to enable a single inbound INVITE to produce multiple outbound INVITE's. This will cause multiple SIP terminals to 'ring' or be alerted. An example of this is: if a call arrives for 1234@private_domain.com and the proxy 'rings' 1234-1@private_domain.com and 1234-2@private_domain.com. When the user answers 1234-2@private_domain.com the proxy causes 'normal' signaling to occur for that session and issues a CANCEL message to the other terminals (i.e. 1234-1 private_domain.com in this example).

Further, SIP proxy 530 can allow DID (direct inward dial) ring of specific terminals (i.e. VoIP extensions) where only a subset of terminals would ring for a given inbound request and/or allow a forking proxy function to ring all or a subset of VoIP/POTS terminals based on inbound request. Both with actual REGISTERed VoIP endpoints and with pseudo VoIP endpoints (i.e. POTS) where the SIP signaling would be artificially generated on behalf of the dumb client. In an alternative embodiment, MGCP or MEGACO (Media Gateway Control Protocol) can be used for local POTS ports.

SIP feature server 540 is a function that provides call related features including: call waiting, call forwarding, last call return, etc. SIP-PSTN (Public Switched Telephone Network) gateway 550 allows integrated VoIP 410 to be connected to a PSTN.

User interface 560 allows a user to enable/disable functionalities on VoIP phone 410. For example, in the default configuration every legacy POTS phone in the home acts as a VoIP extension, user interface 560 allows a user to enable/disable this functionality. User interface 560 allows a user to disable registration or perform ring suppression when the user is outside the home. This is useful when a user takes a number outside of the home. Further, user interface 560 allows a user to specify a distinctive ring based on caller ID information, set time of-day customization and forwarding, and custom voicemail prompts based on caller ID information.

User interface 560 provides a user the option to do either a DID (direct inward dialing) ring of specific terminals or a forking proxy function of "ring all/cancel all except answered on answer." That is, only specific extensions will ring based or the inbound request. In this case, the VoIP phone performs only a single registration.

Figure 6:
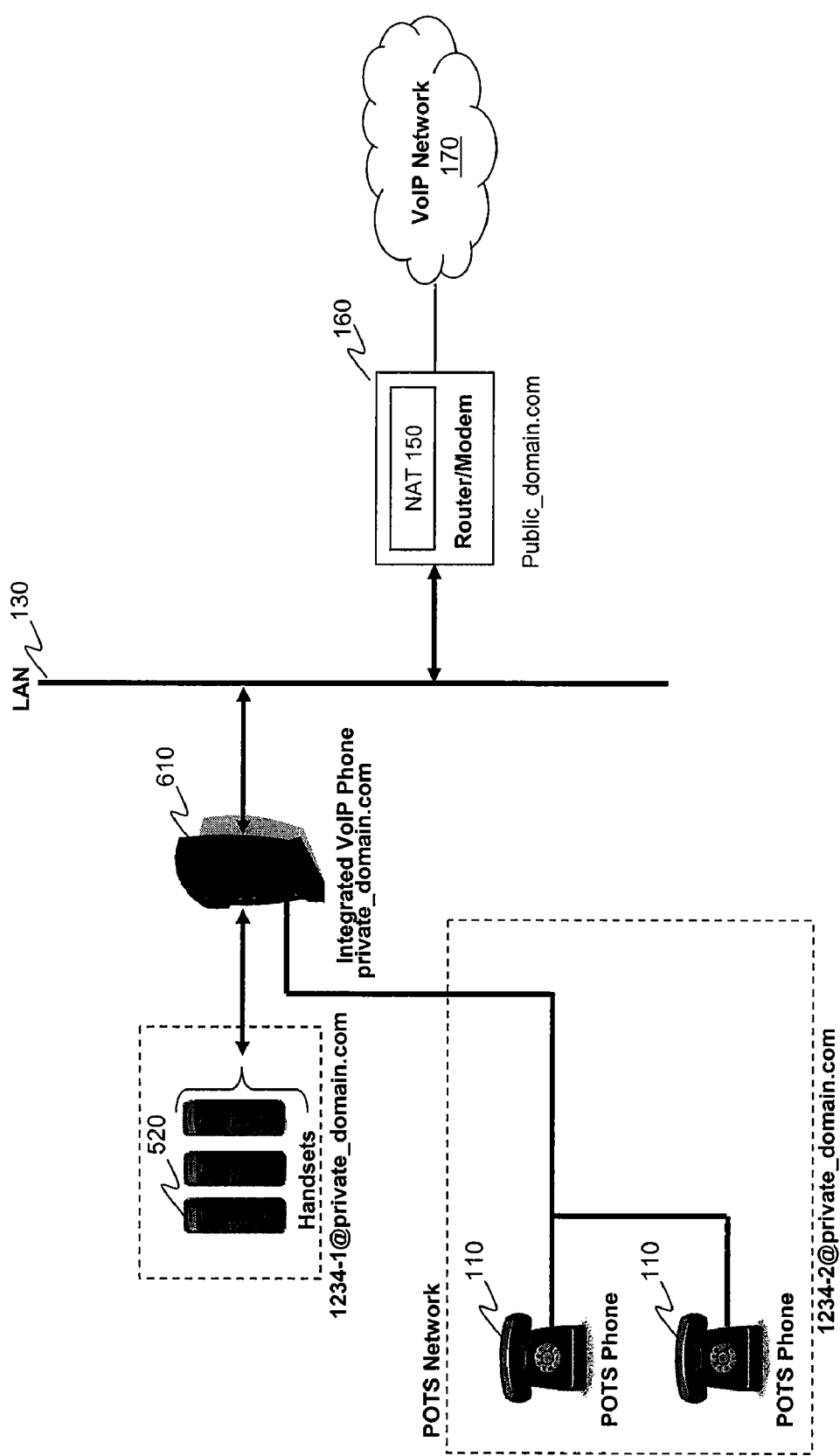
FIG. 6 is a diagram of a portion of a telephone network illustrating a method of connecting an IP telephone and analog telephone to an IP voice network via the same local area network, according to an exemplary embodiment of the invention.

FIG. 6 is a diagram of a portion of a telephone network 600 illustrating an alternative method of directly connecting an IP telephone and analog telephone to an IP voice network via the same local area network, according to an exemplary embodiment of the invention. Telephone network 600 includes integrated VoIP phone 610 which includes an integrated ATA adapter that allows a POTS phone to be connected directly to VoIP phone 610. Integrated VoIP phone 610 is illustrated in FIG. 7.

Figure 7:
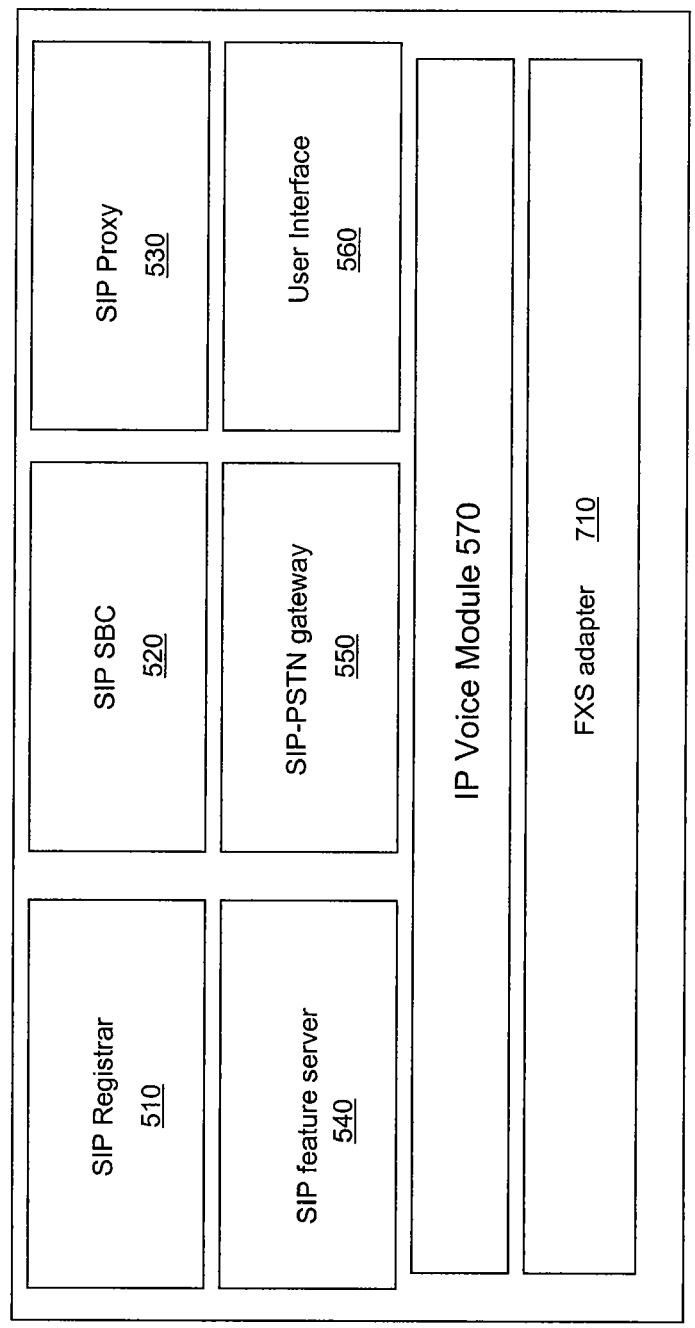
FIG. 7 is a diagram an IP telephone, according to an exemplary embodiment of the invention.

FIG. 7 provides a functional block diagram of integrated IP phone 610, according to an exemplary embodiment of the present invention. Integrated VoIP telephone 610 includes: a SIP registrar 510, SIP SBC 520, SIP proxy 530, SIP feature server 540, SIP-PSTN gateway 550, a user interface 560 and an IP voice module 570. Each of these modules is as described with respect to integrated IP phone 410. Additionally, integrated IP phone 610 includes FXS adaptor 710 that enables POTS phones to be directly connected to integrated IP phone 610.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An integrated Internet Protocol (IP) phone that couples to an analog telephone adaptor that supports one or more analog telephones such that the analog telephones function as virtual extensions of the integrated IP phone, wherein voice over Internet Protocol (VoIP) calls can be placed and received by the analog telephones and the integrated IP phone over an IP network, the integrated IP phone comprising:
   a registrar that manages access signaling information and accepts registration information from the analog telephone adaptor and establishes the one or more analog telephones as extensions of the integrated IP phone;
   a session border controller that controls signaling information between the IP network, the integrated IP phone and the analog telephone adaptor based on the registration information; and
   a voice IP module that enables the integrated VoIP phone to place and receive VoIP calls.

2. The integrated IP phone of claim 1, further comprising a feature server that enables enhanced features within the integrated IP phone and among the one or more analog telephones.

3. The integrated IP phone of claim 2, wherein the integrated IP phone is configured to perform ring suppression when a user is outside a home.

4. The integrated IP phone of claim 2, wherein the integrated IP phone is configured to allow a user to specify a distinctive ring based on an incoming call identifier.

5. The integrated IP phone of claim 2, wherein the integrated IP phone is configured to allow a user to specify custom voicemail prompts based on an incoming call identifier.

6. The integrated IP phone of claim 2, wherein integrated IP phone is configured to allow a user to set how incoming calls are handled based at least in part on a time of-day parameter.

7. The integrated IP phone of claim 2, wherein an analog telephone in an analog telephone network appears on the IP network as a Session Initiation Protocol (SIP) client.

8. An integrated Internet Protocol (IP) phone that couples one or more analog telephones, wherein voice over Internet Protocol (VoIP) calls can be placed and received by the one or more analog telephones and the integrated IP phone over an IP network, the integrated IP phone comprising:
- a registrar that manages access signaling information and accepts registration information from the one or more analog telephones and establishes the one or more analog telephones as extensions of the integrated IP phone;
- a session border controller that controls signaling information between the IP network, the integrated IP phone and the one or more analog telephones based on the registration information;
- an analog telephone adaptor that enables the one or more analog telephones to be directly coupled to the integrated IP phone such that the one or more analog telephones function as virtual extensions of the integrated IP phone; and
- a voice IP module that enables integrated VoIP phone to place and receive VoIP calls.

9. The integrated IP phone of claim 8, further comprising a feature server that enables enhanced features within the integrated IP phone and among the one or more analog telephones.

10. The integrated IP phone of claim 8, wherein the integrated IP phone is configured to perform ring suppression when a user is outside a home.

11. The integrated IP phone of claim 8, wherein the integrated IP phone is configured to allow a user to specify a distinctive ring based on an incoming call identifier.

12. The integrated IP phone of claim 8, wherein the integrated IP phone is configured to allow a user to specify custom voicemail prompts based on an incoming call identifier.

13. The integrated IP phone of claim 8, wherein integrated IP phone is configured to allow a user to set how incoming calls are handled based at least in part on a time of-day parameter.

14. The integrated IP phone of claim 8, wherein an analog telephone in an analog telephone network appears on the IP network as a Session Initiation Protocol (SIP) client.

* * * * *

UNITED STATES PATENT AND TRADEMARK OFFICE
CERTIFICATE OF CORRECTION

PATENT NO. : 8,179,886 B2  
APPLICATION NO. : 11/877429  
DATED : May 15, 2012  
INVENTOR(S) : Hume et al.

Page 1 of 1

It is certified that error appears in the above-identified patent and that said Letters Patent is hereby corrected as shown below:

Title Page, Item (57)  
Abstract, last sentence, please replace "will only directly communicated with the integrated" with --will only directly communicate with the integrated--.

Column 7, Line 1  
Claim 6, please replace "claim 2, wherein integrated IP phone is" with --claim 2, wherein the integrated IP phone is--.

Signed and Sealed this  
Fourteenth Day of August, 2012

David J. Kappos  
*Director of the United States Patent and Trademark Office*